US007530107B1

United States Patent
Ono et al.

(10) Patent No.: US 7,530,107 B1
(45) Date of Patent: May 5, 2009

(54) SYSTEMS, METHODS AND COMPUTER PROGRAM PRODUCTS FOR STRING ANALYSIS WITH SECURITY LABELS FOR VULNERABILITY DETECTION

(75) Inventors: Kouichi Ono, Tokyo (JP); Mika Saito, Yamato (JP); Naoshi Tabuchi, Tokyo (JP); Takaaki Tateishi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/960,153

(22) Filed: Dec. 19, 2007

(51) Int. Cl.
*G06F 21/00* (2006.01)
(52) U.S. Cl. .......................................... 726/25; 717/154
(58) Field of Classification Search .................. 726/25; 717/154–157
See application file for complete search history.

(56) References Cited

U.S. PATENT DOCUMENTS

| 2007/0006294 A1 | 1/2007 | Hunter |
| 2007/0074188 A1 | 3/2007 | Huang et al. |

OTHER PUBLICATIONS

Brumley et al."Creating Vulnerability Signatures Using Weakest Pre-conditions."IEEE Computer Security Foundations Symposium(2007).*
Durden, Tyler. http://www.phrack.com/issues.html?issue=64&id=8.*
Pingali et al. "Dependence Flow Graphs: An Algebraic Approach to Program Dependencies." ACM(1990):67-78.*
Briggs et al. "Pratical Improvements to the Construction and Destruction of Static Single Assignment Form." John Wiley & Sons, Ltd(1998): 1-38.*

* cited by examiner

*Primary Examiner*—Gilberto Barron, Jr.
*Assistant Examiner*—Venkat Perungavoor
(74) *Attorney, Agent, or Firm*—Cantor Colburn LLP; Vazken Alexanian

(57) ABSTRACT

Systems, methods and computer program products for string analysis with security labels for vulnerability detection. Exemplary embodiments include a method in a computer system configured to analyze security-labeled strings and to detect vulnerability, the method including receiving a program with security labels, translating the program into a static single assignment form, constructing a control flow graph having basic blocks as nodes, extracting instructions relating to string functions and object variables, calculating pre-conditions of variables for the basic blocks, extracting constraints among the variables subject to a rule set for translating pre-conditions, solving the constraints and obtaining a set of strings that he object variables form as a context-free grammar to obtain a set of security-labeled strings, checking if the set of security-labeled strings satisfies a rule of the rule set for translating pre-conditions and identifying locations in the program where a vulnerability is detected.

1 Claim, 8 Drawing Sheets

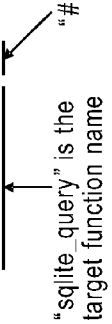

- Don't allow a user to concatenate multiple commands with terminators such as ";" when calling sqlite_query().
  - sqlite_query#1: .*({user};).*

- Don't allow a user to specify field names or a table name of the SELECT command when calling sqlite_query().
  - sqlite_query#1: SELECT ({user}.*) FROM ({user}.*) .*
    - "#1" means the 1st argument
  - "sqlite_query" is the target function name

FIG. 2

- Don't allow a user to output characters '<' and '>' between <script> and </script> by using the echo() function.
  - echo#*: <script>~([{user}^<>]*)</script>

FIG. 3

```
1  #@reliability $_POST["uid"] : {user}.*
2  $uid = $_POST["uid"];
3  $cond = preg_match("[a-zA-Z0-9]+",$uid);
4  if ($cond) {
5    $handle = sqlite_open("foo");
6    $result = sqlite_query($handle, "SELECT name FROM db WHERE uid = " . $uid);
7  }
8  else {
9    error("illegal user ID");
10 }
```

```
L1:
$uid = $_POST["uid"]
$v1 = "[a-zA-Z0-9]+";
$cond = preg_match($v1, $uid)
jump $cond L3
L2:
$v2 = "illegal user ID"
$v3 = error($v2)
goto L4
L3:
$v4 = "foo"
$handle = sqlite_open($v4)
$v5 = "SELECT name FROM db WHERE uid = " . $uid
$result = sqlite_query($handle, $v5)
goto L4
L4:
```

FIG. 4

```
1  # @reliability $_POST["uids"] : {user}.*
2  $uids = split(",", $_POST["uids"]);
3  $i = 0;
4  $uid = $uids[$i];
5  while($uid){
6    $cond = preg_match)"[a-zA-Z0-9 ]+", $uid);
7    if ($cond) {
8      $handle = sqlite_open("foo");
9      $result = sqlite_query($handle, "SELECT name FROM db WHERE uid = " . $uid);
10   }
11   else {
12     error("illegal user ID");
13   }
14   $i ++;
15   $uid = $uids[$i];
16 }
```

```
L1:
  $v0 = $_POST[ "uid "]
  $v7 = ","
  $uids = split($v7, $v0)
  $i1 = 0
  $uid1 = $uids[$i1]
L2:
  $uid = φ($uid1,$uid2)
  $v0 = eq($uid,#null)
  jump $v0 L7
L3:
  $v1 = "[a-zA-Z0-9 ]+";
  $cond = preg_match($v1, $uid)
  jump $cond L5
L4:
  $v2 = "illegal user ID"
  $v3 = error($v2)
  goto L6
L5:
  $v4 = "foo"
  $handle = sqlite_open($v4)
  $v5 = "SELECT name FROM db WHERE uid = " . $uid
  $result = sqlite_query($handle, $v5)
  goto L6
L6:
  $i = φ($i1,$i2)
  $i2 = $i + 1
  $uid2 = $uids[$i2]
  goto L2
L7:
```

FIG. 6

SYSTEMS, METHODS AND COMPUTER PROGRAM PRODUCTS FOR STRING ANALYSIS WITH SECURITY LABELS FOR VULNERABILITY DETECTION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to string analysis, and particularly to systems, methods and computer program products for string analysis with security labels for vulnerability detection.

2. Description of Background

String analysis and taint analysis are analysis techniques used for vulnerability detection of SQL injection or XSS, and they complement one another. In string analysis, strings, which may be constructed by the program, are inferred, and vulnerabilities can be detected by comparing the inferred strings with the expected strings. In taint analysis, vulnerabilities can be detected through calculating taintedness of each datum based on how the datum is constructed from other data, in order to check if the datum includes tainted (untrustable) fragments.

However, when checking, for example, if "user input strings in the query are constructed only by numeric characters" using each analysis technique, whether the strings were input by the user or were defined as constants within the program cannot be determined through string analysis. In addition, whether or not the strings are constructed only by numerical characters cannot be determined through taint analysis. Moreover, even if string analysis and taint analysis are performed separately and their results are combined, this process can only determine whether or not the entire string obtained through the string analysis is tainted. For this reason, it is difficult to detect substrings that have been constructed by certain tainted sources, such as the "user input".

Additionally, these analysis techniques often cause false detections, since, in many cases, analyses are performed without considering conditional statements in the program. Programs usually determine and filter out insecure data which cause SQI, injection or XSS with conditional statements, and if insecure data are found, the program performs data correction (sanitization) to avoid security flaws. Therefore, analysis techniques that do not take into consideration conditional statements and data sanitization will yield a significant number of false detections, and thus are often not practically useful.

SUMMARY OF THE INVENTION

Exemplary embodiments include a method in a computer system configured to analyze security-labeled strings and to detect vulnerability, the method including receiving a program with security labels, translating the program into a static single assignment form, constructing a control flow graph having basic blocks as nodes, extracting instructions relating to string functions and object variables, calculating, pre-conditions of variables for the basic blocks, extracting constraints among the variables subject to a rule set for translating pre-conditions, solving the constraints and obtaining a set of strings that he object variables form as a context-free grammar to obtain a set of security-labeled strings, checking it the set of security-labeled strings satisfies a rule of the rule set for translating pre-conditions and identifying locations in the program where a vulnerability is detected.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a systems and methods that enable string analysis while taking the origins of characters into consideration. Moreover, by calculating pre-conditions, the systems and methods described herein can perform a detailed analysis. As a result, in vulnerability detection, not only the form of strings, but the origins can be taken into consideration in detecting vulnerabilities. Furthermore, false detections caused by conditional statements can be suppressed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of a rule set for SQL injection in accordance with exemplary embodiments.

FIG. 3 illustrates one example of a rule set for XSS in accordance with exemplary embodiments;

FIG. 4 illustrates one example of a PHP program and its intermediate program in accordance with exemplary embodiments;

FIG. 6 illustrates an example of PHP programs and its intermediate program in accordance with exemplary embodiments;

Figure 1:
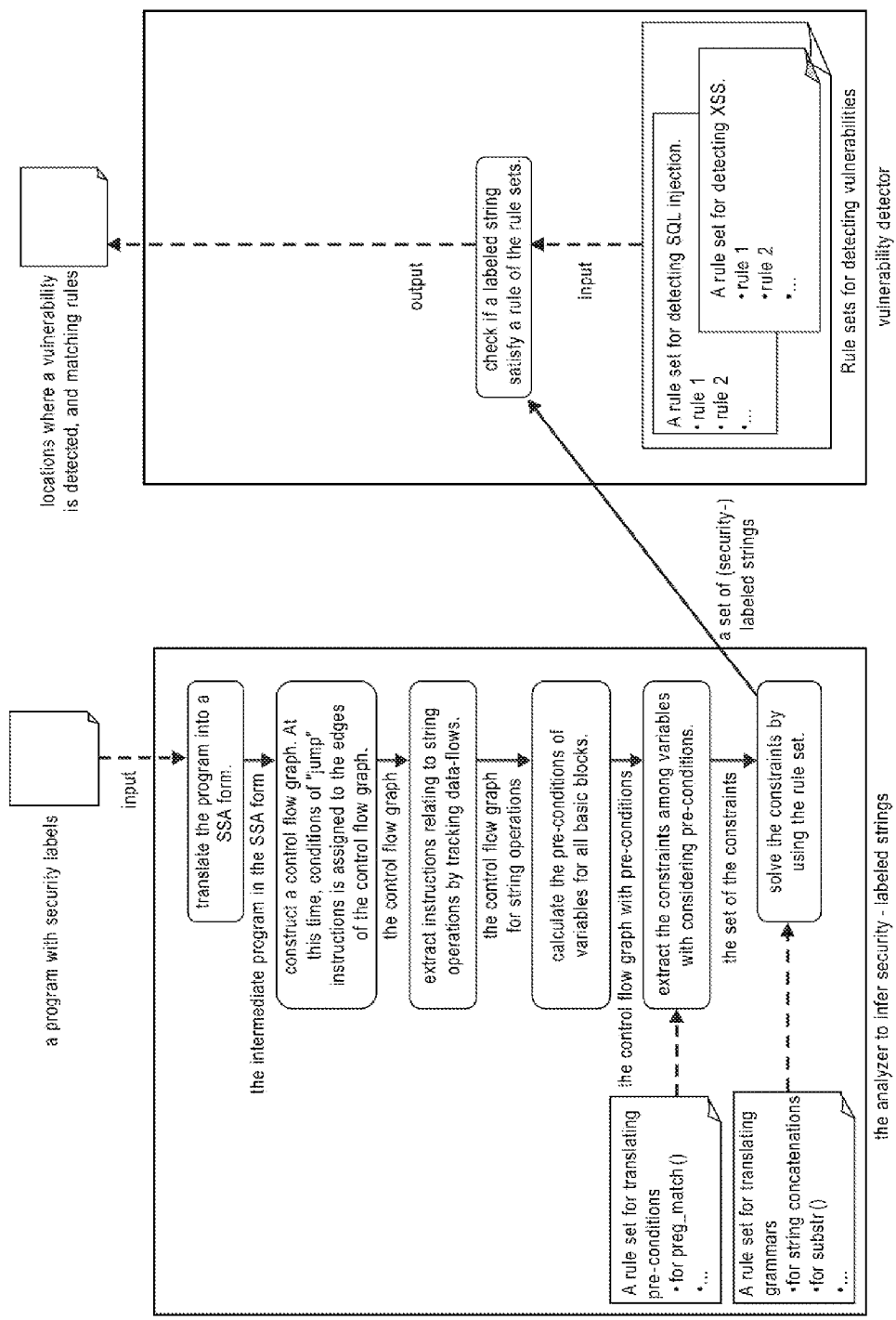
FIG. 1 illustrates a system level block diagram of a security-labeled string analyzer and a vulnerability detection system in accordance with exemplary embodiments.

The detailed description explains the preferred embodiments of the invention, together with advantages and features, by way of example with reference to the drawings.

DETAILED DESCRIPTION OF THE INVENTION

In exemplary embodiments, the systems and methods described herein provide detection techniques that can detect SQL injection or cross-site scripting (XSS) vulnerabilities. In exemplary embodiments, the systems and methods described herein analyze tainting, not only of strings but of characters, by assigning security labels which indicate the character origins. Concerning the operation or generation of strings, it infers strings while discriminating between secure characters and non-secure characters using a program analysis technique based on string analysis (string analysis with security labels), and detects if query operations or HTML document containing non-secure substrings may become vulnerabilities in the program. Moreover, a technique that prevents false detection by considering conditional statements has been newly adopted in order to enhance practicability.

In exemplary embodiments, the systems and method described herein perform string analysis while taking security labels of substrings (the source of each character) into consideration by assigning a security label for each character and applying a constraint-based program analysis technique. Security labels are defined dependent on the application domain as a partially-ordered set with the partial order relation $\leq$: as an example, $A \leq B$ shows that B is more secure than A. For another example, user$\leq$admin$\leq$const represents that the three labels of "user", "admin", and "const" have an order relationship in this particular order. Then, "user" is assigned to characters input by the user, "admin" is assigned to characters by the application administrator, and "const" is assigned to characters that appear in the literals of the program. The Cartesian product of the character set $\Sigma$ and the security label set Z, $\Sigma \times Z$ is called a set of security-labeled characters, and the set of sequences of its elements, $(\Sigma \times Z)^*$ is called a set of security-labeled strings. The Cartesian product is a combinatorial set of individual set elements. As an example, let $\Sigma=\{$"a", "b"$\}$ and $Z=\{$user, admin, const$\}$, then $\Sigma \times Z=\{$("a", user), ("a", admin), ("a", const), ("b", user), ("b", admin), ("b", const)$\}$.

In exemplary embodiments, in the string analysis, the analysis target program is translated into SSA (static single assignment) form as the intermediate representation, and then constraints on the sets of security-labeled strings, which are possible values of variables or right side expressions are extracted. At this point, each constraint is annotated with its pre-condition, under which the constraint is valid; such conditions are inferred from conditional statements in the program. By resolving these constraints, the set of security-labeled strings for each variable can be obtained as a context-free grammar, and the grammar represents the set of possible values of the variable.

Subsequently, whether or not security-labeled strings that are prone to vulnerability are included in the obtained set of security-labeled strings is examined. In this examination, the set of non-secure strings is described in regular expressions with security labels, and whether or not substrings of any elements (strings) of the obtained set of security-labeled strings match these regular expressions is examined.

In exemplary embodiments, the systems described herein include a security-labeled string analyzer and a vulnerability detection unit, as described in FIG. 1. The security-labeled string analyzer receives the program with security labels as input and outputs strings that may potentially be output from the program as a set of security-labeled strings. The vulnerability detection unit compares the output results with the rule set for vulnerability detection. When there is a corresponding rule, the unit outputs the substring that conforms to the rule and the corresponding rule. At this point, the program with the security labels is a set of security-labeled strings $(\Sigma \times Z)^*$ assigned to the input unit (input function fi$\in$Fi or constant c$\in$C), with a description: I(pair of the input unit and security label)$\in$(Fi$\cup$C)$\times(\Sigma \times Z)^*$ as a comment in the program. Such sets shall be given as a regular expression over the set of security-labeled characters.

In addition, in the rule set for vulnerability detection, the target variables and regular expressions over the set of security-labeled characters are specified in order to describe string patterns that may cause vulnerabilities, as seen in FIG. 2 and FIG. 3, for example. Target variables can be specified using variable names or as the $n^{th}$ argument of a function.

"Procedures of analysis" are now described, and "regular expressions with security labels", "rules for translating pre-conditions", and "rules for translating grammars" are described thereafter.

In exemplary embodiments, the program with security labels is translated into the intermediate SSA form. The intermediate program in SSA form is expressed as pairs of basic blocks and labels, and a basic block is expressed as a sequence of the instructions defined as below. At this point, the definition of each variable is translated in the intermediate program in SSA form so as to make them unique; this is known as SSA translation, and is given as follows:

[Const] v:=c (v is variable, c is constant)

[Apply] v:=f(v1,v2 . . . ,vn) (f is function, v, v1,v2, . . . ,vn are variables)

[($\Phi$|:=($\Phi$)(v1,v2, . . . ,vn) (v1,v2, . . . vn are variables)

[Goto] goto l(l is a label)

[Jump] jump v l (v is variable, l is a label)

In exemplary embodiments, the Goto instruction and Jump instruction appear only at the end of the instruction sequence of each basic block. Taking this into consideration, the intermediate program induces a control flow graph with basic blocks as nodes, having edges which correspond to the Goto instructions and Jump instructions. At this point, the edges corresponding to the Jump instructions are divided into 2 groups: the edges when variable v is true (jump edges), and the edges when variable v is false (fall-through edges). The instructions relating to string functions and object variables are then extracted.

In exemplary embodiments, in order to calculate the pre-conditions B(v) of variable v in basic block BB, first obtain the condition P(BB) under which the program reaches the basic block BB, using the following, method: 1) Assign logical expressions v and $\neg$v respectively to the jump edges and the fall-through edges in the control flow graph. At this point, v is the variable of the corresponding Jump instructions. Additionally, assign true to the edges corresponding to the Goto instructions; 2) Set up equations P(BB')=(P(BB1)$\wedge$p(BB1,BB'))$\vee$ . . . $\vee$P(BBn)$\wedge$p(BBn,BB')) for basic block BB'. At this point, p(BB) expresses the condition to reach basic block BB, and p(BBi,BB') expresses the logical formula assigned to the edge (BBi, BB'). If BB is the entry basic block, i.e. it has no incoming edges, let P(BB)=true; and 3) Calculate the condition P(BB) to reach each basic block BB by resolving the simultaneous equations obtained in step 2).

In SSA form, each variable vi (i=1,2, . . . ,n) is defined uniquely. Thus, taking this unique definition into consideration, the logical formula Q=P (BB)[ei/vi] is obtained by replacing variables vi (i=1,2, . . . n) in P(BB) with its definition ei. At this point, A[e/v] represents replacing the variable, v, in the logical formula A with the logical formula e. Then, B(BB,vi)=$\{$x|Q[x/vi]$\}$, the set of values of vi that satisfy the formula Q, becomes the pre-condition of variable vi used in basic block BB. At this point, if there is a string-compare function f that results in Q=f(x1, x2, . . . ), the pre-condition is translated into a logical expression that does not contain f, in accordance with the "pre-condition translation rules" that is further described herein.

In exemplary embodiments, by expressing the set of security-labeled strings it was possible to form with the variables or expression e as S (e), the following constraints are applied to each assignment instruction (Const instruction, Apply instruction, Φ instruction) of each basic block:

[Const instruction] $S(v) \supseteq D\ S(c)$
[Apply instruction] $S(v) \supseteq F'(S(vi) \cap (B'(BB,vi))$
[(instruction] $S(v) \supseteq (S(v1) \cup (B'(BB,v1)) \cap (\ldots ((S(vn) \cap (B(BB,vn))$ However, when c and f are input units, denoting the set of security-labeled strings assigned to them by S', the following constraint is extracted for both the Const instruction and Apply instruction, not the constraints above: $S(v) \supseteq S'$. Here, F' is called the approximation of f, and is a function over the set of security-labeled strings such that $\forall v1, v2, \ldots, vn\ \exists vi(\{v1, v2, \ldots, vn\}$.
$f(v1,v2,\ldots,vn) \in rmSecLabel(F'(S(vi)))$ is satisfied.

In exemplary embodiments, F' is pre-defined in the grammar translation rule set for each function f and its arguments. rmSecLabel(A) is a function that obtains the set of strings in which security labels are removed from the set of security-labeled strings A. These grammar translation rules support the transducer and homomorphism that are used in the reference [YMinamide05]. The method to automatically translate the grammar translation rules used in the prior art into the grammar translation rules used in this invention will be explained in greater detail under [Grammar Translation Rules]. In addition, B' (v) is a set that satisfies: $B'(v) \supseteq B(v)$, with respect to the pre-condition B(v) for variable v assigned to the basic block.

In exemplary embodiments, the newly-obtained constraints are solved and obtain the set of strings S(v) that object variable v can form as a context-free grammar are obtained.

In exemplary embodiments, for each target variable v, the systems and methods described herein then test if any elements in string set S(v) do not meet each rule of ri in the "rule set for detecting vulnerabilities". In order to do this, the systems and methods described herein test whether or not $S(v) \cap L(ri)$ is empty. In exemplary embodiments, a CYK algorithm as known in the art can be used.

A regular expression with a security label uses (a description method) {label}c instead of character c used in normal regular expression, indicates a character to which "label" is assigned as its security label, and can be given as:

| | |
|---|---|
| regexp = regexp regexp | concatenation |
| \|regexp\|regexp | alternation |
| \|(regexp) | |
| \|~regexp | negation |
| \|char | character |
| \|[charSet] | character set |
| \|[^charSet] | negation of [charSet] |
| charSet = char - char | |
| \|char charSet | |
| char = {label} (character) | |

The following mnemonic expressions are also adopted:
({label} regexp) Security levels of all characters in regexp are labeled.
({label} regexp) indicates all character in regexp is assigned "label" as the security label
({label+} regexp) is a shorthand for ({label} regexp)|({label1} regexp)| . . . |({labelN} regexp)
  where label1 . . . labelN $\in \{1 | label < 1\}$
({label−} regexp) is a shorthand for ({label } regexp)|({label1} regexp)| . . . |({labelN} regexp)
  where label1, . . . ,labelN$\in \{1\ |1 < label\}$ In exemplary embodiments, a pre-conditions translation rule is defined for each string-compare function f in order to translate $\{xi | f(x1,x2,\ldots,xN)\}$ into a set expression of strings not containing f. For example, the rule for the string-compare function preg_match( ) is defined as $\{y | preg_{13}match(x,y)\} = S(x)$.

Furthermore, grammar translation rules define rules for translating grammars, using the transducer or homomorphism over the set of security-labeled characters. Such a transducer, T, is defined by $(\Sigma \times Z, \Gamma \times Z, S, s0, \rho, \omega)$. Here, $\Sigma$ is a set of input characters, $\Gamma$ is the set of output characters, Z is the set of security labels, S is the set of states with s0 as the initial state, $\rho$ is the state-transition function, and $\omega$ is the output function. Formally, $\rho \in S \times (\Sigma \times Z) \to S$ and $\omega \in S \times (\Sigma \times Z) \to (\Gamma \times Z)$, respectively. In addition, homomorphism is a transducer consisting of 1 state.

Moreover, techniques are provided to automatically extend a transducer for a character set to a transducer for a security-labeled character set. By means of this technique, grammar translation rules can be defined without taking into consideration security labels. To do this, when a transducer $T=(\Sigma, \Gamma, S, s0, \rho, \omega)$ over the character set is given, define the transducer $T'=(\Sigma', \Gamma', S, s0, \rho', \omega')$. Here, $\Sigma'=\Sigma \times Z$, $\Gamma'=\Gamma \times Z$. $\rho'(s,(\sigma, z))=\rho(s, \sigma)$, and $\omega'(s,(\sigma, z))=\omega'(s, \sigma), z)$. However, when security-labeled characters output by the output function are decided dependent on the arguments of the function, define it as $\omega'(s, (\sigma, z))=((\omega)(s, \sigma),z')$, using the security label of the argument z'.

In exemplary embodiments, rules for detecting vulnerabilities provide target variables and a set of strings that may contain vulnerabilities from among the strings assigned to the variables as regular language with security labels. The target variables can be specified using the variable names in the intermediate program or as the nth argument of a certain function. Here, the nth argument of function f is expressed as f#(n-1). In addition, it is also possible to extend the rules for detecting vulnerabilities so that sets of strings which obviously do not contain vulnerabilities can be described. In this case, the rules for detecting vulnerabilities are expressed by a combination of the following 3: must/must Not rule type, target variable, and set of strings (regular expression with Security labels). Here, a 'must' rule indicates that the string assigned to the target variable definitely matches with the regular expression with security labels, and a must Not rule indicates that the string assigned to the target variable does not match with the regular expression with security labels in the same sense as the rules for detecting vulnerabilities before being extended.

Figure 8:
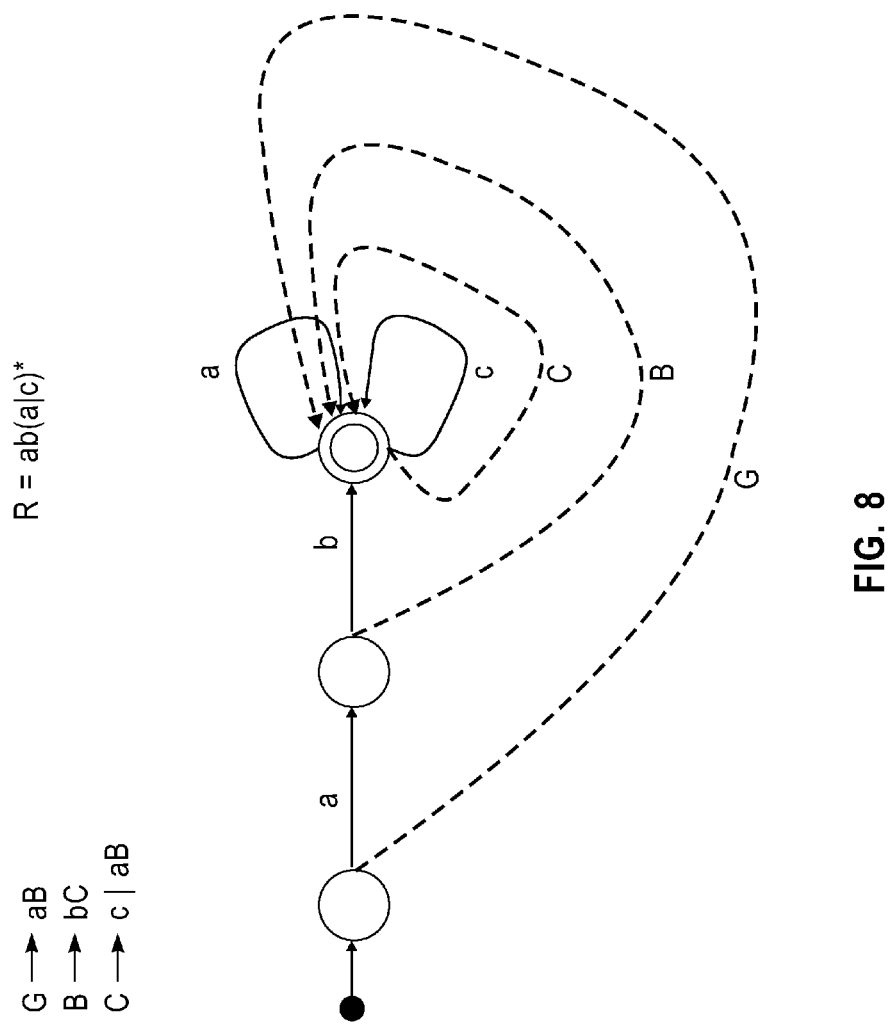
FIG. 8 illustrates a flow chart for a CYK algorithm in accordance with exemplary embodiments.

The following describes the steps for deciding emptiness (by the CYK algorithm) of $L(G) \cap L(R)$, given the context-free grammar G and regular language (regular expression) R as in FIG. 8. Here, the state transition diagram described in FIG. 8 is all automaton representing the regular language R: (1) In accordance with the rule 'C →c' of grammar G, add state transition C (red line), which corresponds to state transition c of the automaton; (2) In accordance with the rule 'B→bC' of grammar G, add state transition B (green line), which corresponds to state transitions b and C of the automaton; and (3) In accordance with the rule 'G→aB' of grammar G, add state transition G (blue line), which corresponds to state transitions a and B of the automaton. Thus, the state transition G from the initial state to the final state of the automaton can be found by the above operation; therefore, it is concluded that L(G)∩L(R)≠φ (i.e. common element exists). In addition, if R=aba*, state transition G from the initial state to the final state cannot be added by the above operation; therefore, it is concluded that L(G)∩L(R)=φ (i.e. no common element exists). In general, after adding a state transition corresponding to each rule of grammar G as much as possible, if a state transition from the initial state to the final state of the automaton exists, L(G)∩L(R) can be determined to be non-empty (common elements exist). On the contrary, if no such state transition exists, it can be determined to be empty (no common element exists).

In another example, the processes of detecting SQL injection vulnerabilities applying the systems and methods described herein to a program containing a simple jump statement and string concatenation ([example 1]) and a program containing an iteration statement and string operation (split) ([example2]) is described below, following the above steps.

Figure 5:
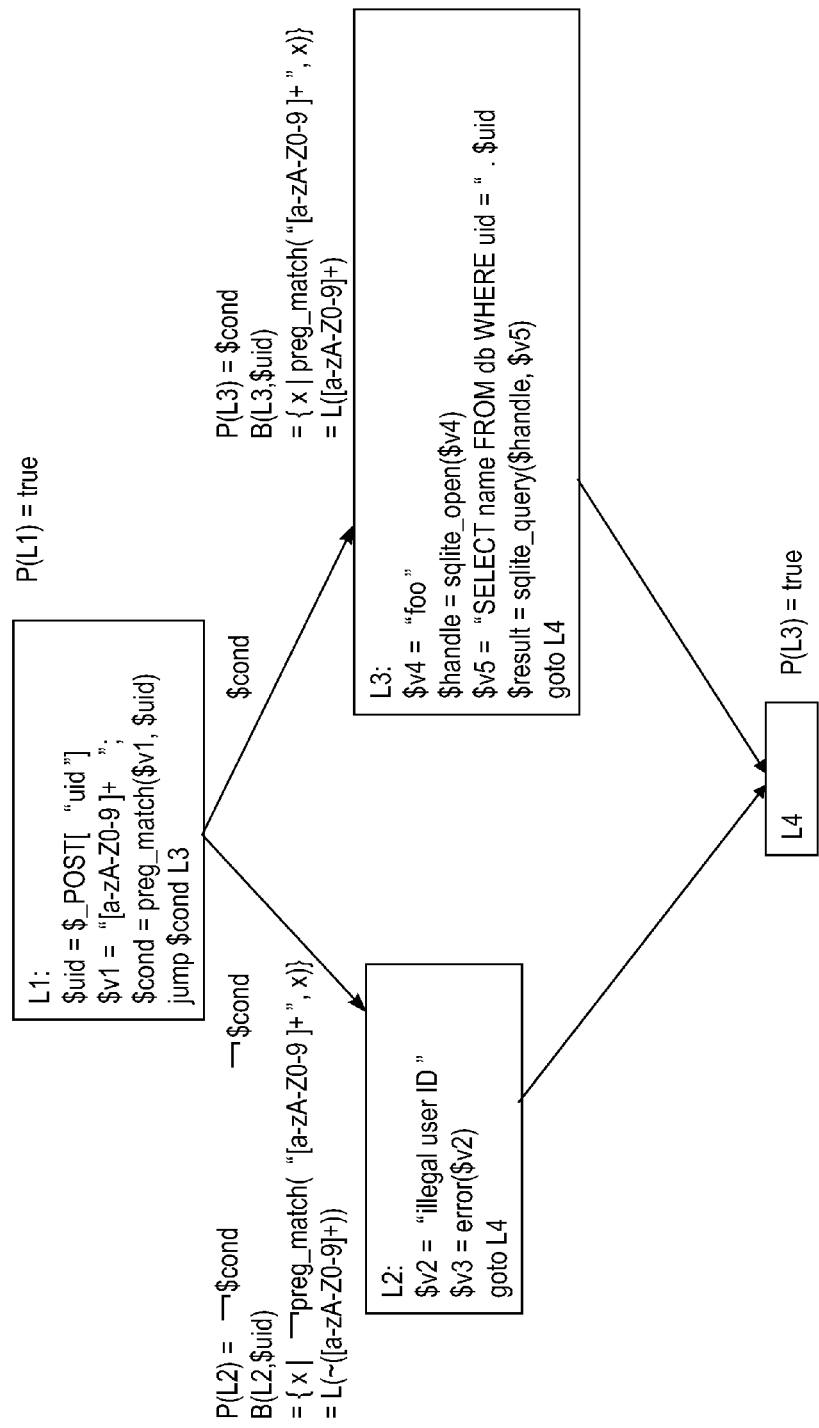
FIG. 5 illustrates a control flow graph and preconditions of FIG. 4 in accordance with exemplary embodiments.

The top-left section of FIG. 5 is an example of PHP programs with security labels. In PHP, data passed on to the PHP program from the browser by the POST method is stored in the $_POST variable as strings. A set of security-labeled strings of the variable $_POST["user"] that is input is assigned by @reliability in the comment line, and {user}.* represents "any strings input by the user".

The intermediate program of such a program is shown in the lower right section of FIG. 4. In this intermediate program, all the instructions affect string operation. Therefore, all the instructions are extracted in the extraction of instructions relating to string operation. FIG. 5 is the control flow graph and calculated the pre-conditions of each basic block. Pre-conditions BB(L2,$uid) and BB(L3,$uid) were calculated respectively from the solutions of the following equations:

$P(L1) = true$ $P(L2) = P(L1) \wedge \overline{\$cond}$ $P(L3) = P(L1) \wedge \$cond$ $P(L4) = P(L2) \vee P(L3)$ In the figure, L(regexp) represents a set of strings that matches with the regular expression regexp. Next, constraints among variables are extracted as follows. However, the example focuses on the extraction of SQL injection vulnerabilities at this point, and lists only constraints that can be extracted from the instructions concerning variable v5, the 2nd argument of sqlite_query( ), given by:

$S(\$uid) \supseteq l(\{user\}.*)$ $S(\$v5) \supseteq Concat(S(\$uid) \cap L([a-zA-Z0-9]+))$ Here, Concat(x) returns a set of strings constructed by concatenating a string "SELECT name FROM db WHERE uid=" to the beginning of individual strings in string set x. As described in the figure, L([a-zA-Z0-9]+) is calculated by {x|preg_match("[a-zA-Z0-9]+", x)}=S([a-zA-Z0-9]+)=L([a-zA-Z0-9]+) using the pre-condition translation rules. Since this string is a constant in the program, its security label is const. By solving these constraints, the following context-free grammar can be obtained, given by:

$U → $X1

$X1 → \au $X1 | ϵ

$V5 → SELECT_name_FROM_db_WHERE_uid_=_$X2

$X2 → \wu $X2

In the above grammar, \au represents any character of the security label user, \wu represents alphanumeric characters of the security label user, and the underscore (_) represents a blank character. Letting this context-free grammar with security labels be G, the following is the result of a comparison of G with the rule set for SQL injection in FIG. 2.

$L(G) \cap L(.*(\{user\};)*) = \phi$ $L(G) \cap L(SELECT(\{user\}.*)FROM(\{user\}.*).*) = \phi$ This indicates that no SQL injection vulnerabilities are detected in the program in FIG. 4. Another case can be assumed in which there is a strict rule such as "user input strings must not be used other than for FROM and SELECT strings", as in the following:

sqlite_query#1:SELECT({user}.*)FROM({user}.*)

In this case, $L(G) \cap (SELECT(\{user\}.*)FROM(\{user\}.*))$

Therefore, it is assumed that a vulnerability has been detected. At this point, the 6th line of the program in the top-left section of FIG. 1 is displayed as a location where a vulnerability was detected, as well as the potential matching rules. For example, when preg_match("[a-zA-Z0-9]+", $uid) in the 3rd line is preg_match($regex, $uid), {x|preg_match($regex, x)}=S($regex) becomes the pre-condition.

Figure 7:
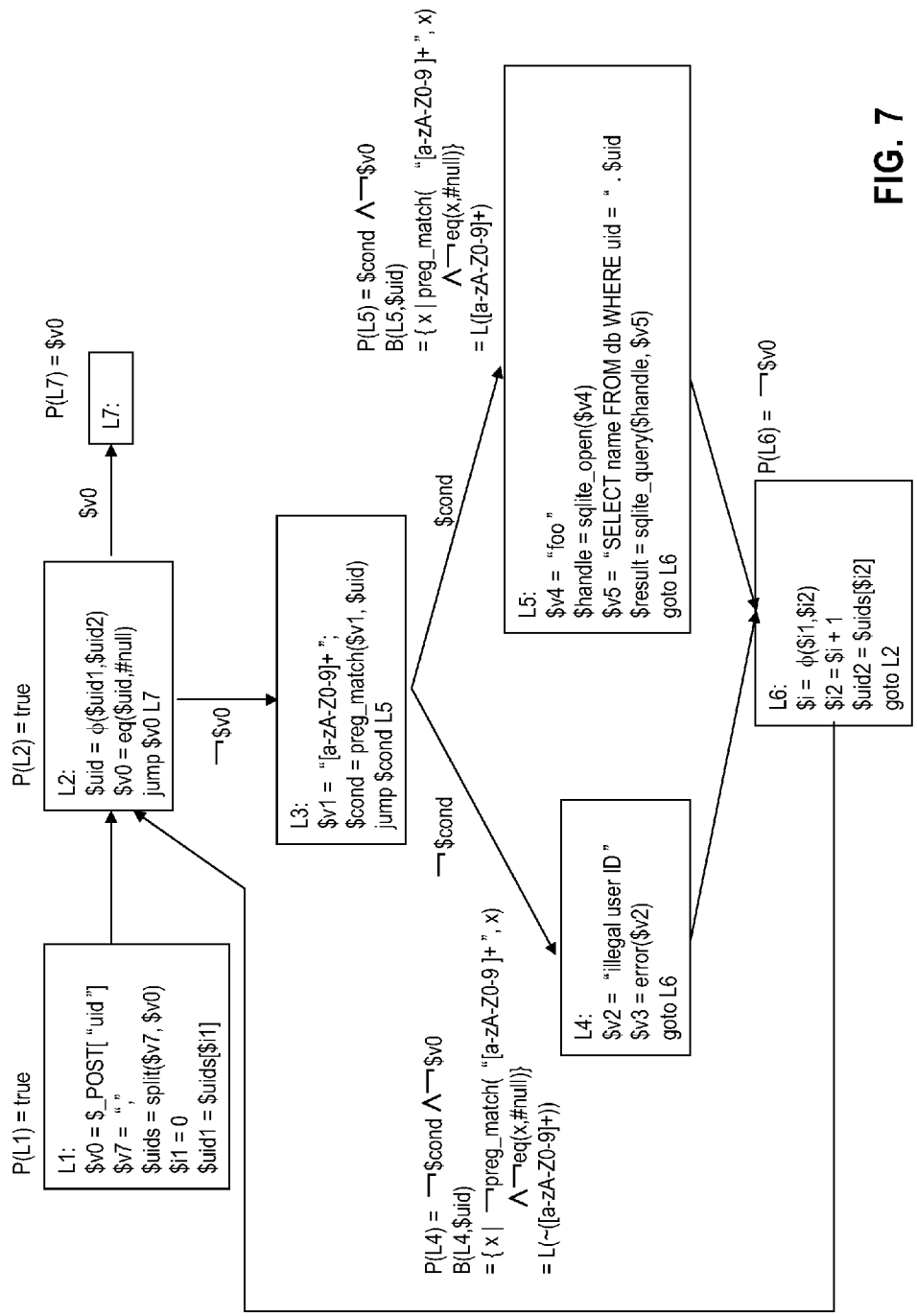
FIG. 7 illustrates a control flow graph and pre-conditions for FIG. 6 in accordance with exemplary embodiments.

Another example can be described with respect to FIGS. 6 and 7. The top-left section of FIG. 6 is a PHP program with security-labels, and its intermediate program is in the bottom right section of FIG. 6. S set of security-labeled strings is assigned to S_POST["uid"], a variable that is input. The control flow graph for this intermediate program and the preconditions focusing on "$uid" are described in FIG. 7. Pre-conditions BB (L4,$uid) and BB(L5,$uid) were calculated by solving the following equations:

$P(L1) = true$ $P(L2) = P(L1) \vee P(L6)$ $P(L3) = P(2) \wedge (\$v0)$ $P(L4) = P(L3) \wedge (\$cond)$ $P(L5) = P(L3) \wedge \$cond$ $P(L6) = P(L4) \vee P(L5)$ $P(L7) = P(L2) \wedge \$v0$ Focusing on the extraction of SQL injection vulnerabilities at this point, constraints that can be extracted from the instructions concerning variable v5, the 2nd argument of sqlite_query( ), are listed below:

$S(\$v0) \supseteq L(\{user\}.*)$ $S(\$uids) \supseteq Split(S(\$v0))$ $S(\$uid1) \supseteq GetElem(S(\$uids))$ $S(\$uid2) \supseteq GetElem(S(\$uids))$ $S(\$uid) \supseteq S(\$uid1) \cup S(\$uid2)$ $S(\$v5) \supseteq Concat(S(\$uid) \cap L([a-zA-Z0-9]+))$ Here, it is assumed that Split(x) is pre-defined in the grammar translation rule set to become Split(x)⊇{c|y∈ rmSecLabel(x), cs=split(",", y), c∈cs} where rmSeclabel(x) returns a string in which security labels are removed. In the above, a string array is returned by split, however, a string array is considered to be a set of strings, ignoring its order. In addition, the operation of extracting one element from the array is approximated by the grammar translation rule that states GetElem(a)=a.

By solving the above constraints and focusing on the nonterminal symbol $V5 that corresponds to S($v5), the following context-free grammar can be obtained:

$V5→SELECT_name_FROM_db_WHERE_uid_=_$X2

$X2→\wu $X2

Figure 9:
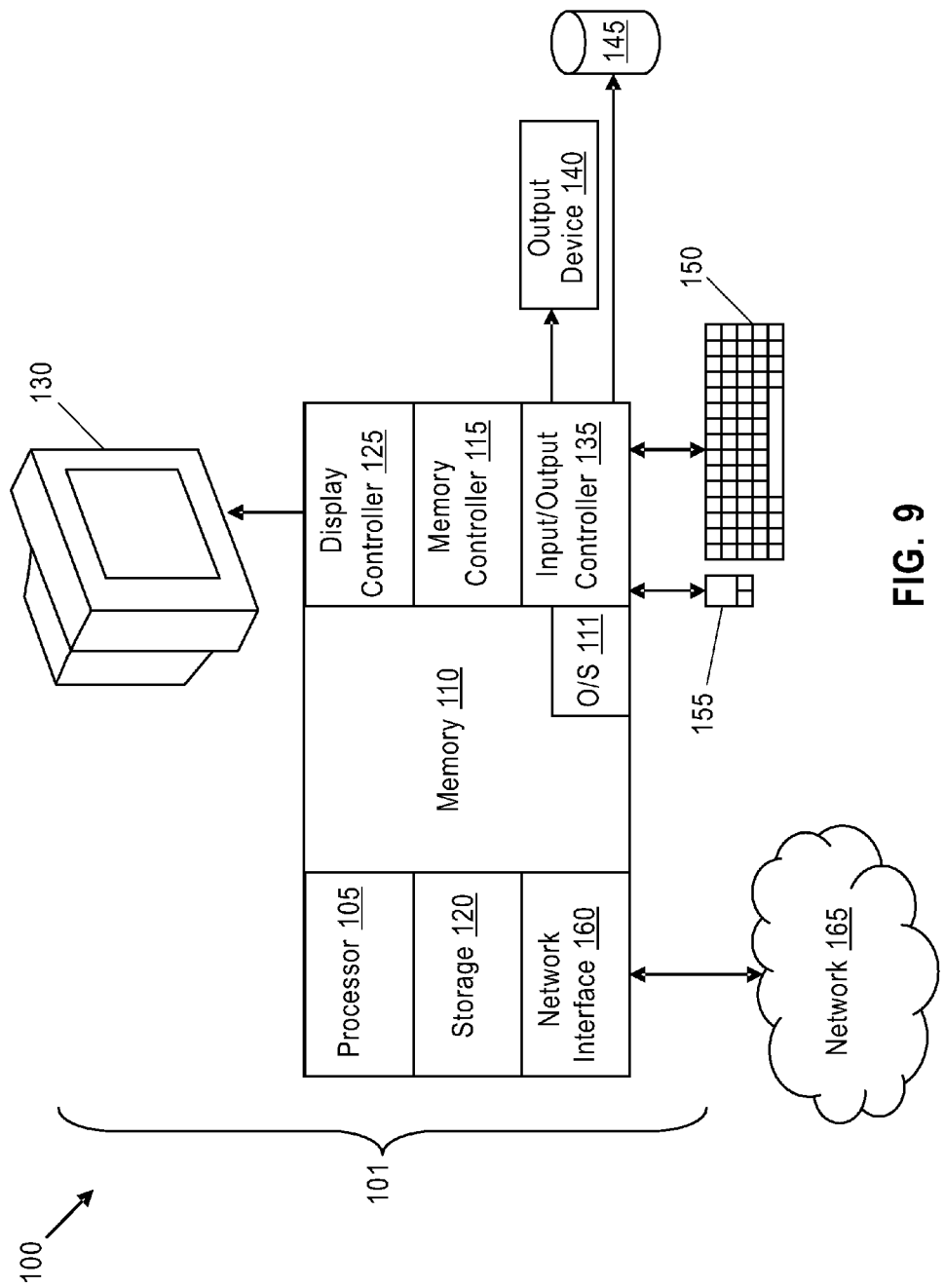
FIG. 9 illustrates an exemplary embodiment of a system for string analysis with security labels for vulnerability detection.

FIG. 9 illustrates an exemplary embodiment of a system 100 for string analysis with security labels for vulnerability detection. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 101, memory 1 10 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 14 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 9, the software in the memory 110 includes the string analysis methods described herein in accordance with exemplary embodiments and a suitable operating system (O/S) 111. The operating system 111 essentially controls the execution of other computer programs, such the string analysis systems and methods described herein, and provides scheduling, input-output control, file and data management, memory management, and communication control and related services.

The string analysis methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the string analysis methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax. etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the O/S 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The string analysis methods described herein and the O/S 111, in whole or in part, but typically the latter, are read by the processor 105, perhaps buffered within the processor 105, and then executed.

When the systems and methods described herein are implemented in software, as is shown in FIG. 9, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The string analysis methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the string analysis methods are implemented in hardware, the string analysis methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, one or more processes in the memory 110 can monitor activity from the keyboard 150 and the mouse 155 or a combination thereof. The processes can further monitor long-running jobs that have been initiated on the computer 101. The processes can further monitor which and how many other machines can control the computer 101 either locally or remotely. In exemplary embodiments, the processes can also inquire or accept a grace period input by a user of the computer 101. The grace period can be a tine period after which all traffic to and from the computer ceases if no further activity has been sensed by the processes. In this way, if a user has left the computer 101 for an extended period of time or has left the computer (e.g., after a work day) the computer 101 no longer allows traffic to and from the computer 101. In an alternative implementation, the computer 101 can totally power down after the grace period has expired. In further exemplary embodiments, the processes can accept traffic only from a common network maintenance control system that provides limited services.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system configured to analyze security-labeled strings and to detect vulnerability, a method consisting of:

receiving a program with security labels previously assigned to strings known to have a vulnerability, wherein the strings have an associated character set, given by $\Sigma$, and an associated security label set, given by Z, wherein a set of security-labeled characters is defined by a Cartesian product of the associated character set and the security label set, given by $\Sigma \times Z$, and wherein a set of security labeled strings is defined by a set of sequences of the security labeled characters, given by $(\Sigma \times Z)^*$, wherein the program with security labels is given as $(Fi \cup C) \times (\Sigma \times Z)^*$, where Fi is an input function and C is a constant;

translating the program into a static single assignment form;

constructing a control flow graph from the static single assignment form, the control graph having basic blocks as nodes;

extracting instructions relating to string functions and object variables;

calculating pre-conditions of variables for the basic blocks, having goto instructions and jump instructions, the jump instructions having jump edges defined when a respective object variable is true and fall through edges defined when the respective object variable is false;

wherein calculating the pre-conditions of the variables for the basic blocks include obtaining a condition under which the program reaches each of the basic blocks;

extracting constraints among the variables subject to a rule set for translating pre-conditions;

solving the constraints and obtaining a set of strings that the object variables form as a context-free grammar given by L(G), from a regular language expression, given by L(R), to obtain the set of security-labeled strings, wherein the context-free grammar is obtained by applying a transducer given by $T=(\Sigma \times Z, \Gamma \times Z, S, s0, \rho, \omega)$ where $\Gamma$ is a set of output characters, S is a set of states with s0 as an initial state, $\rho$ is a state-transition function and $\omega$ is an output function such that $\rho \in S \times (\Sigma \times Z) \rightarrow S$ and $\omega \in S \times (\Sigma \times Z) \rightarrow (\Gamma \times Z)$;

checking if the set of security-labeled strings satisfies a rule of the rule set for translating pre-conditions, thereby assuring that no vulnerability exists on the security labeled strings;

identifying locations in the program where a vulnerability is detected, the vulnerability being detected when no common element $\phi$ exists given by $L(G) \cap L(R) \neq \phi$ and no vulnerability being detected when the comment element $\phi$ does exist given by $L(G) \cap L(R) = \phi$; and identifying a false detection of vulnerabilities in the security-labeled strings via rules that include a must rule type, a must not-rule type, a target variable and the security-labeled strings,
wherein the must rule indicates that a string assigned to the target variable matches with the regular expression with security labels, and the must-not rule indicates that the string assigned to the target variable does not match with the regular expression with security labels, thereby indicating the false detection.

* * * * *